United States Patent
Roberts

[11] 3,978,778
[45] Sept. 7, 1976

[54] BEVERAGE-MAKING APPARATUS
[75] Inventor: Melvin F. Roberts, Chicago, Ill.
[73] Assignee: Bloomfield Industries, Inc., Chicago, Ill.
[22] Filed: Feb. 5, 1975
[21] Appl. No.: 547,101

[52] U.S. Cl. .................................. 99/281; 99/305
[51] Int. Cl.² ........................................ A47J 31/00
[58] Field of Search .................... 99/281, 279–280, 99/282–283, 284, 288–289, 290, 295, 297, 299–300, 301–302, 303–304, 305

[56] References Cited
UNITED STATES PATENTS

| | | | |
|---|---|---|---|
| 2,926,234 | 2/1960 | Palmer | 99/281 X |
| 3,353,474 | 11/1967 | MacCorkell | 99/291 X |
| 3,523,178 | 8/1970 | Spensley et al. | 99/281 X |
| 3,589,271 | 6/1971 | Tarrant | 99/305 |

Primary Examiner—Stanley N. Gilreath
Assistant Examiner—Arthur O. Henderson
Attorney, Agent, or Firm—Edward C. Threedy

[57] ABSTRACT

A coffee-making apparatus of the pour-over type wherein the liquid for brewing coffee is contained in an electrically heated state within an upright container and is siphoned out when cold liquid is introduced into the container; the apparatus having a hot water container, the cover of which covers and seals the same while at the same time providing a support for a water inlet, a siphon outlet, a vent, and all the electrical components necessary for heating the liquid.

8 Claims, 6 Drawing Figures

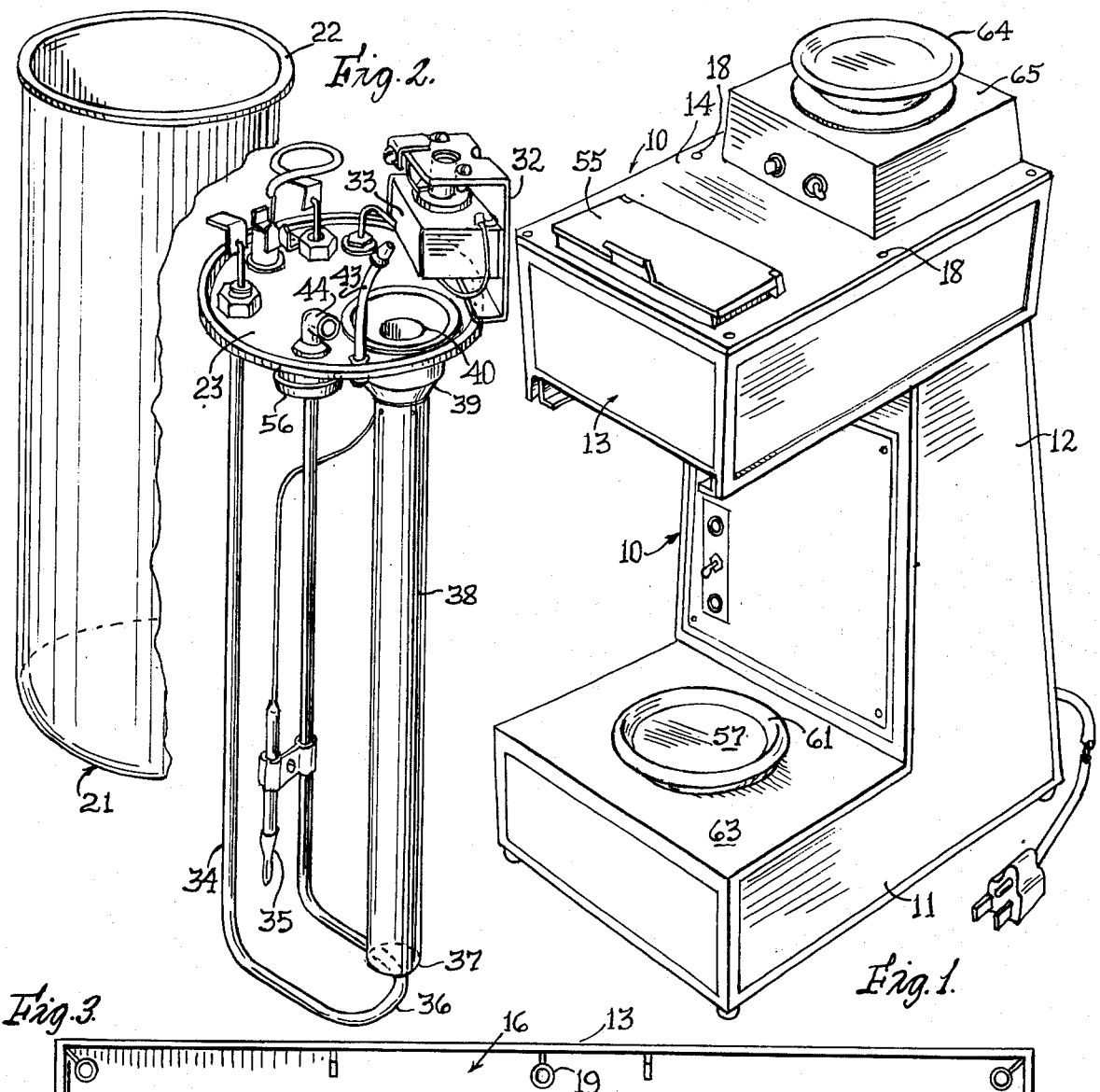
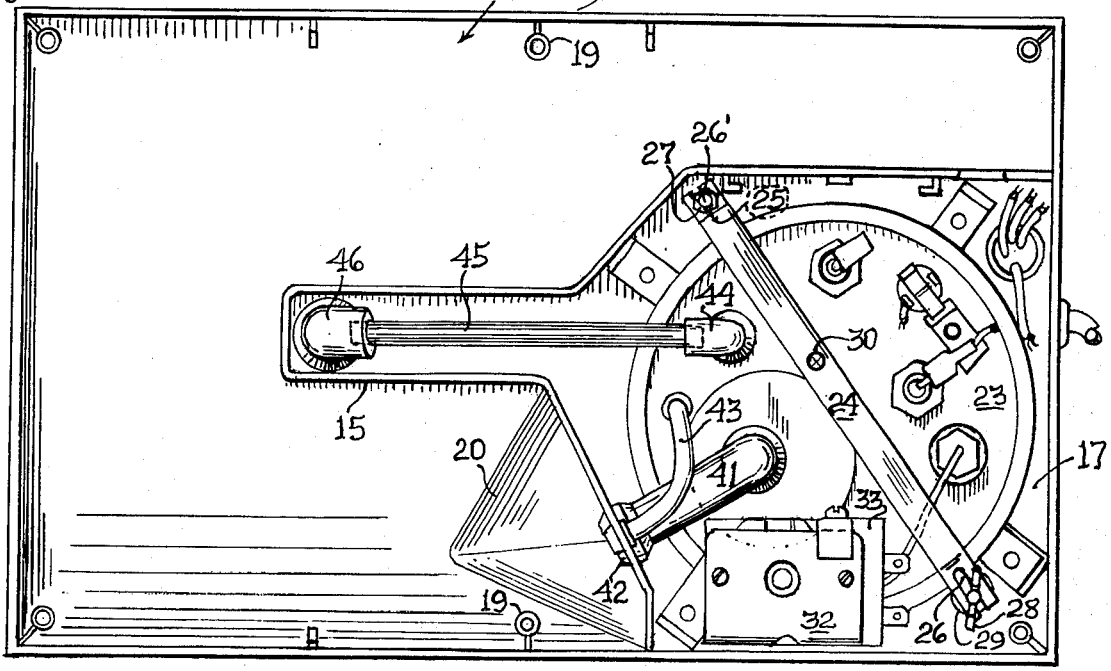

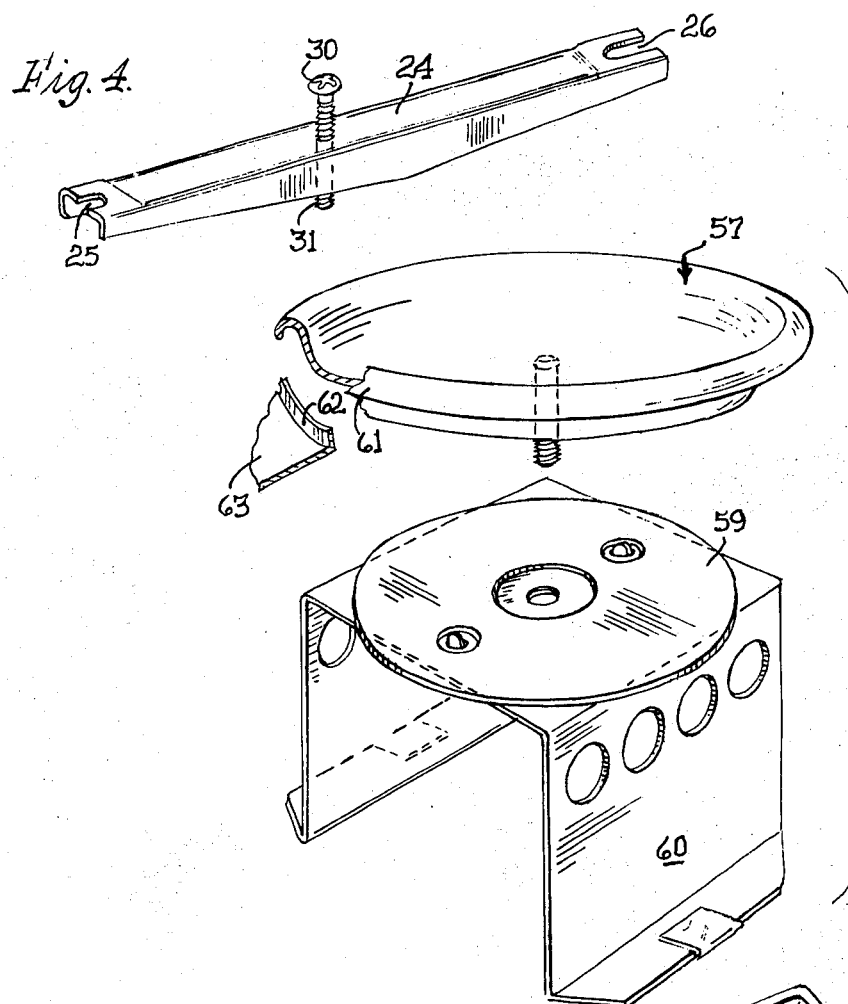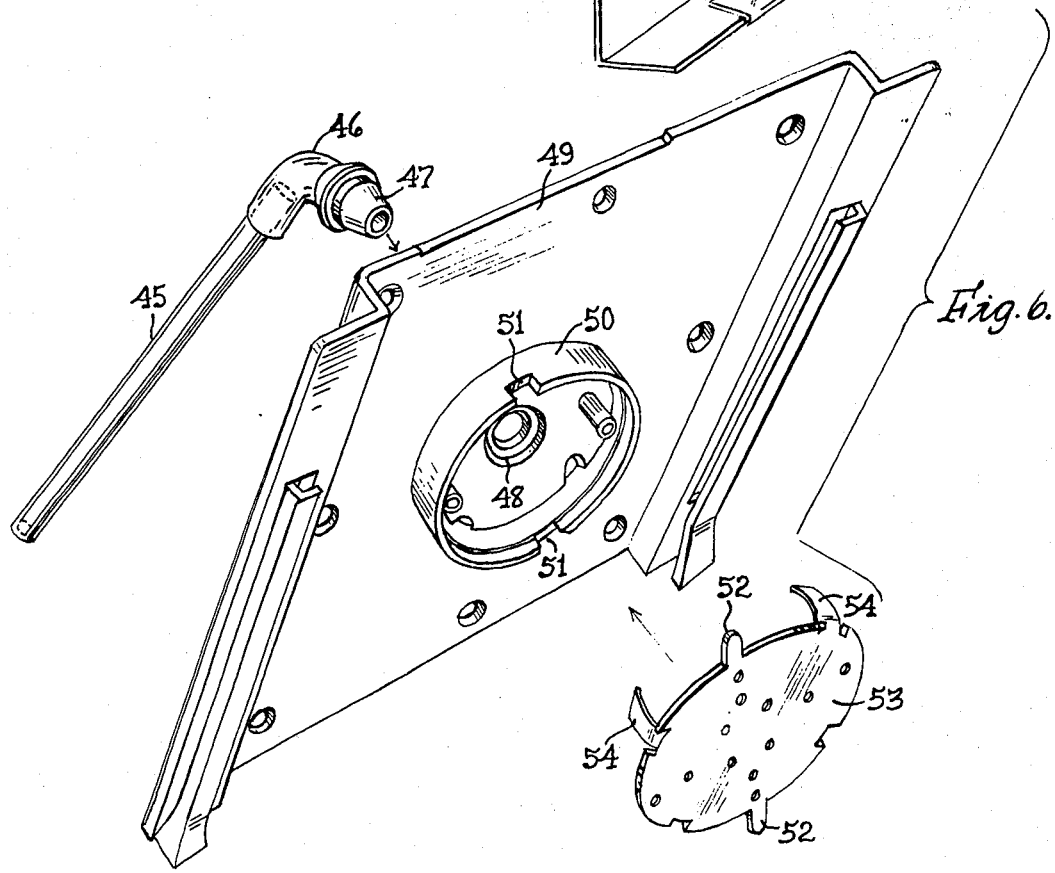

BEVERAGE-MAKING APPARATUS

SUMMARY OF THE INVENTION

This invention relates to a beverage-making apparatus which constitutes an improvement over the apparatus disclosed in U.S. Letters Pat. No. 3,513,767 dated May 26, 1970, and the art referred to therein.

The beverage-making apparatus includes an upright container having a removable cover that functions to both close and hermetically seal the container. The cover is readily removed from the container and is designed so as to support a water inlet, a siphon hose, a vent, and all the electrical connections necessary for the operation of the apparatus.

The water inlet provided by the cover of the container has open communication with a cold water receiving trough formed in the upper horizontal shelf of the apparatus. This trough is closed by a top wall of the apparatus, with the entire structure being so designed that all of the components of the apparatus may be readily removed from the apparatus for servicing and repair.

In areas of lime deposits, the structural elements have been designed to prevent excess build-up by providing enlarged cross-sectional areas, for example, in the cold water inlet of the induction tube and in the head of the hot water discharge spray.

The simplicity of the design permits ready servicing and repair and requires nothing more than a single simple tool for the removal of all of the structural elements of the device.

The invention will be best understood by reference to the accompanying drawings, in which the preferred embodiment of the invention is disclosed, wherein:

FIG. 1 is a perspective view of the beverage-making apparatus;

FIG. 2 is a partial perspective view of the liquid container and a full perspective view of the cover and associated components;

FIG. 3 is a top plan view of the apparatus with the top wall removed;

FIG. 4 is a perspective view of the quick-release latch member for the cover;

FIG. 5 is a perspective view of the warming plate associated with the apparatus;

FIG. 6 is a perspective view of the spray head and snap-in cover therefor.

In FIG. 1 the beverage-making apparatus is indicated generally at 10 and, as such, includes a base 11 supporting at one end a hollow upright standard 12, which in turn supports a horizontal chamber 13 adapted to be closed by a removable cover 14. The chamber 13 of the apparatus 10 is compartmentized by a wall 15 so as to form a water basin 16 and a component compartment 17. Both of the compartments formed in the chamber 13 are adapted to be closed by the cover 14, which by a plurality of suitable connectors such as Allen screws 18 are adapted to be threaded into sockets 19. The bottom wall of the water basin 16 is formed to provide a tapered drain 20, which in turn has communication with an opening formed in the compartmentizing wall 15, as shown in FIG. 3.

The bottom wall of the component compartment 17 is provided with an enlarged circular opening into which is adapted to be placed a liquid container 21. The liquid container 21 provides a laterally projecting peripheral flange 22 which is adapted to rest upon the wall edge defining the opening in the bottom wall of the component compartment 17. The container 21 is adapted to be closed by a cover 23. This cover 23 is adapted not only to close the container 21, but also to hermetically seal the same. In order to accomplish this, the cover 23 is yieldably sealed upon the flange 22 of the container 21 by a latch bar 24.

As viewed in FIG. 4, the latch bar 24 comprises an elongated member, the opposite ends of which are slotted as at 25 and 26. Within the component compartment 17, to either side of the central opening formed in the bottom wall thereof, there is provided an upstanding stud 26' having partially threaded thereon a nut 27 under which the slotted end 25 of the latch bar 24 is adapted to be projected. The opposite end 26 of the latch bar 24 is adapted to be projected under a wing nut 28 threadable into a post 29. It will be noted that the slot 26 is of a length greater than the slot 25, thus permitting the latch bar 24 to be moved longitudinally in the direction of its length a sufficient distance so that the slotted end 25 may be disengaged from the stud 26' and then, when moved in the opposite direction, the slotted end 26 will become disconnected from the post 29.

To effect sealing of the cover 23 onto the container 21, the latch bar 24 provides a pressure screw 30 which is threadable through the bar 24 in a plane perpendicular to its longitudinal axis. The inner end 31 of the screw 30 will bear upon the top wall of the cover 23 so as to yieldably seal the same upon the flange 22 of the container 21.

The cover 23 provides a bracket 32 which supports a suitable thermostat control 33, which, in turn, is electrically connected to and controls the operation of the heating element 34 through the heat-sensing element 35. It will be noted that the heating element 34 depends from the underside of the cover 23 and is so designed as to provide its inner end 36 in close proximity to the outlet 37 of the water induction tube 38.

This water induction tube 38 provides an enlarged mouth 39 which is connected to and extends below the cover 23 and has open communication with an opening 40 formed therein. The enlarged mouth 39 normally lies beneath the head or surface of the fluid in the tank 21 and, as such, any deposits of lime or the like that may accummulate in such area will not reduce or restrict the mouth opening to such a degree that it prevents the free and full flow of fluid therethrough. The enlarged mouth 39 of the induction tube 38 has normally connected thereto an elbow hose 41 which in turn projects as at 42 through the opening formed in the compartmentizing wall 15 and has communication with the drain 20, as shown in FIG. 3. The cover 23 also carries a vent tube 43 which likewise has one end connected to an opening formed in the compartmentizing wall 15 above the connection of the hose 41 thereto.

The cover 23 provides a water outlet nozzle 44 which by a tube 45 is connected to a hose coupling 46 which in turn provides a spray head 47. The spray head 47 is adapted to be projected through an opening 48 formed in a wall plate 49 which is connected to the underside of the chamber 13. The wall plate 49 provides a ring 50 which is adapted to encircle the opening 48 with the exposed edge of the ring 50 notched as at 51 so as to receive locating lugs 52 which radially extend beyond the periphery of a spray disc 53. The spray disc 53 is frictionally attached to the ring 50 by spring fingers 54.

The operation of the beverage-making apparatus is well-known in the art, and, as such, it provides for a quantity of liquid to be retained in the container 21, with such liquid being electrically heated by the heating element 34. When, for instance, coffee is desired to be brewed, the operator will open the hinged lid 55 carried by the top wall 14 and introduce into the water basin 16 a predetermined quantity of cold liquid. The liquid will flow through the drain 20, the elbow hose 41, down the induction tube 38, and be introduced into the container 21 adjacent the bottom thereof and in close proximity to the end of the heating element 34. The introduction of the water will raise the liquid head or water level in the container 21 above the discharge end of the spray nozzle 47, creating a siphon effect through the siphon tube 45. The amount of hot water discharged therethrough will continue until the water level falls below the inner end 56 of the outlet nozzle 44. All of the foregoing is a well known function in pour-over type beverage-making apparatuses. The previously known beverage-making apparatuses required frequent servicing because of the build-up of lime deposits collected from the water in the areas of the mouth of the induction tube 38 as well as the spray head 47. To overcome this problem, the mouth 39 of the induction tube 38 has been enlarged so as to increase the cross-sectional area thereof, which in turn prevents excess build-up of lime deposits. The same applies to the spray head 53, the outlet opening 48 formed in the plate 49 being of such diameter so as to prevent excess build-up of lime deposits which would interfere with the discharge of water therethrough.

In FIG. 5 there is shown in perspective the warming tray 57 which provides a threaded stud 58 adapted to be threaded into an electrically heated plate 59 carried by a support bracket 60 within the base 11 of the apparatus. The warming plate 57 is provided with a downwardly curved and inwardly directed lip 61 which is adapted to be placed over and to the outside of a complementary lip 62 formed in the upper wall 63 covering a portion of the base 11, as shown in FIG. 1. This prevents any liquid that is spilled onto the wall 63 from reaching the interior of the base 11. The same construction is included in the warming plate 64 which is carried by the housing 65 positioned on the rear portion of the cover 14 of the chamber 13.

From the foregoing, it is obvious that there has been disclosed a beverage-making machine wherein the components which normally require servicing and cleaning are carried by the cover of the liquid container and are readily accessible to the serviceman without completely disassembling or dismantling the apparatus.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A beverage making apparatus including
   a. a housing for said apparatus providing a base portion, a hollow upright standard, and an upper chamber,
   b. a wall member within said upper chamber defining a liquid basin and a dry compartment disposed in side-by-side relation, with both having open communication with said hollow standard,
   c. a removable liquid container supported by said dry compartment within said upright standard between said base portion and said upper chamber,
   d. a removable cover for said liquid container closing the same from said dry compartment of said upper chamber,
   e. means carried by said cover for delivering liquid from said liquid basin through said dry compartment into the bottom of said liquid container,
   f. means carried by said cover for electrically heating the liquid in said liquid container,
   g. means carried by said cover for dispensing heated liquid by siphon action from said liquid container through said dry compartment to a remotely located dispensing head, and
   h. means for latching said cover on said liquid container and for hermetically sealing the same thereto.

2. A beverage-making apparatus as defined by claim 1 wherein said means for latching said cover on said liquid container comprises an elongated removable bar extending transversely across the top of said cover, said bar providing a means for compressing said cover in a sealed relation onto said liquid container after said bar has latched said cover thereon.

3. A beverage-making apparatus as defined by claim 1 wherein said means carried by said cover for delivering the liquid from said liquid basin to the bottom of said liquid container comprises an elongated induction tube of a length less than the depth of said liquid container, said tube providing at its point of connection to said cover an enlarged mouth extending below the surface of said cover.

4. A beverage-making apparatus as defined by claim 3 wherein said means for latching said cover on said liquid container comprises an elongated removable bar extending transversely across the top of said cover, said bar providing a means for compressing said cover in a sealed relation onto said liquid container after said bar has latched said cover thereon.

5. A beverage-making apparatus as defined by claim 4 wherein said means for electrically heating the liquid in said liquid container comprises a sealed heating element having a portion thereof disposed beneath and in spaced relation to the open end of said induction tube for delivering the liquid to the bottom of said liquid container for heating the liquid as it is dispensed into the liquid container from said liquid basin.

6. A beverage-making apparatus as defined by claim 3 wherein said means for electrically heating the liquid in said liquid container comprises a sealed heating element having a portion thereof disposed beneath and in spaced relation to the open end of said means for delivering the liquid to the bottom of said liquid container for heating the liquid as it is dispensed into the liquid container from said liquid basin.

7. A beverage-making apparatus as defined by claim 1 wherein said means for electrically heating the liquid in said liquid container comprises a sealed heating element having a portion thereof disposed beneath and in spaced relation to the open end of said means for delivering the liquid to the bottom of said liquid container for heating the liquid as it is dispensed into the liquid container from said liquid basin.

8. A beverage-making apparatus as defined by claim 7 wherein said means for latching said cover on said liquid container comprises an elongated removable bar extending transversely across the top of said cover, said bar providing a means for compressing said cover in a sealed relation onto said liquid container after said bar has latched said cover thereon.

* * * * *